United States Patent
Mizoguchi et al.

(10) Patent No.: US 12,523,574 B2
(45) Date of Patent: Jan. 13, 2026

(54) MACHINING ACCURACY DIAGNOSING DEVICE AND MACHINING ACCURACY DIAGNOSING METHOD FOR MACHINE TOOL

(71) Applicant: OKUMA CORPORATION, Niwa-Gun (JP)

(72) Inventors: Yuji Mizoguchi, Niwa-Gun (JP);
Takashi Norihisa, Niwa-Gun (JP);
Toshihiko Murahashi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 450 days.

(21) Appl. No.: 18/156,471

(22) Filed: Jan. 19, 2023

(65) Prior Publication Data
US 2023/0236089 A1 Jul. 27, 2023

(30) Foreign Application Priority Data

Jan. 24, 2022 (JP) .................. 2022-008874
Dec. 19, 2022 (JP) .................. 2022-202434

(51) Int. Cl.
*G06F 11/30* (2006.01)
*B23Q 11/14* (2006.01)
(Continued)

(52) U.S. Cl.
CPC .......... *G01M 99/005* (2013.01); *B23Q 11/148* (2013.01); *G01K 1/026* (2013.01); *G01K 1/14* (2013.01)

(58) Field of Classification Search
CPC .................................................. G01M 99/005
See application file for complete search history.

(56) References Cited

FOREIGN PATENT DOCUMENTS

JP S59-183340 U1 12/1984
JP 2001-157923 A 6/2001
(Continued)

OTHER PUBLICATIONS

Japanese Office Action (with English translation) dated Apr. 30, 2025 (Application No. 2022-202434).

*Primary Examiner* — Phuong Huynh
(74) *Attorney, Agent, or Firm* — BURR PATENT LAW, PLLC (57) ABSTRACT

A machining accuracy diagnosing device includes a temperature regulation operating pattern setting unit, a cutting condition setting unit, a temperature information acquiring unit, and a machining accuracy influence amount predicting unit. The temperature regulation operating pattern setting unit sets an operating pattern of a temperature regulating unit. The cutting condition setting unit sets a scheduled machining start time and a scheduled machining end time. The temperature information acquiring unit acquires an influencing temperature of the temperature regulating unit on the machine body temperature and/or an air temperature outside the plant. The machining accuracy influence amount predicting unit predicts an influence amount of the temperature regulating unit on the machining accuracy based on the operating pattern, the scheduled machining start time and the scheduled machining end time, and at least one of the influencing temperature and/or the air temperature outside the plant and a set temperature of the temperature regulating unit.

11 Claims, 5 Drawing Sheets

(51) Int. Cl.
  *G01K 1/02* (2021.01)
  *G01K 1/14* (2021.01)
  *G01M 99/00* (2011.01)

(56) References Cited

FOREIGN PATENT DOCUMENTS

| | | | |
|---|---|---|---|
| JP | 2013-228922 A | 11/2013 | |
| JP | 5912756 B2 | 4/2016 | |
| JP | 2019136846 A * | 8/2019 | ............. B23Q 15/18 |

* cited by examiner

MACHINING ACCURACY DIAGNOSING DEVICE AND MACHINING ACCURACY DIAGNOSING METHOD FOR MACHINE TOOL

CROSS REFERENCE TO RELATED APPLICATION

This application claims the benefit of Japanese Patent Application Numbers 2022-008874 filed on Jan. 24, 2022 and 2022-202434 filed on Dec. 19, 2022, the entirety of which is incorporated by reference.

FIELD OF THE INVENTION

The disclosure relates to a device and a method that predicts and diagnoses an influence on a machining accuracy of a machine tool when a room temperature or the like changes in an environment where the machine tool is placed.

BACKGROUND OF THE INVENTION

When performing a machining using a machine tool, a change in room temperature inside a plant causes a thermal displacement in the machine tool, resulting in degradation of a machining accuracy of a workpiece.

In order to maintain the machining accuracy of the machine tool, it is effective to use an air conditioner, which includes an air-conditioning installation and air-conditioning equipment, such that the room temperature inside the plant does not significantly change. However, if advanced temperature management were constantly performed for 24 hours, consumption energy of the air conditioner could increase, and a cost burden also could increase. Therefore, it is preferred that a power source of the air conditioner is turned off during nighttime and on weekends when workers are not present. However, in that case, the room temperature rapidly changes when the air conditioner is started up again, raising a problem in which it takes a long time until the accuracy of the machine tool is stabilized.

As another method for reducing the thermal displacement of a machine tool, a thermal displacement compensation has been widely used. In the thermal displacement compensation, temperature sensors are mounted on respective structure parts of the machine tool, displacement amounts are calculated based on measured temperatures, and amounts of axial movements are changed according to the calculated displacement amounts. However, an accuracy of the thermal displacement compensation has a limitation, and an error occurs when a temperature change is large. When the room temperature rapidly changes, for example, at the start-up of the air conditioner in winter, the error of the thermal displacement compensation is considered to become large.

As countermeasures against the above problems, Japanese Patent No. 5912756 discloses a method for estimating a temperature change in an environment where a machine tool is placed based on a temperature of a structure of the machine tool and diagnosing a magnitude of an influence on the thermal displacement based on the temperature change.

In addition, JP1984-183340 U1 discloses a method for keeping the temperature of a machine tool constant even in an environment where a room temperature changes to reduce the thermal displacement by surrounding the entire machine tool with a cover and controlling the temperature inside the cover to be constant using an air conditioner.

The method of Japanese Patent No. 5912756 can identify the magnitude of the influence of the thermal displacement at present but cannot identify until when the influence lasts. Therefore, it is difficult to create a machining schedule based on a diagnostic result.

The method of JP 1984-183340 U1 is considered to be very effective in reducing the thermal displacement due to a room temperature change. However, energy is consumed for an air conditioner for a machine tool. In addition, the method is a countermeasure method for the machine tool alone. When attempting to ensure accuracy in various machine tools that are new and old inside a plant, an air conditioner for the plant is required as in the past.

Conventionally, in many cases, when a room temperature changes, for example, at the start-up of an air conditioner, a period until the accuracy of a machine tool is stabilized is predicted based on an empirical rule to decide a time to perform a machining and a time to start up the air conditioner. However, the period until the accuracy is stabilized varies depending on an influence of an outside air temperature and the like, and judgment criteria differ depending on a size of the machine tool, a required period for the machining, and a required accuracy. While it is easy to predict when workpieces are the same every time, it is difficult to predict only by the empirical rule when workpieces are different.

Therefore, it is an object of the disclosure to provide a machining accuracy diagnosing device and a machining accuracy diagnosing method for a machine tool that can quantitatively predict an influence of a temperature regulating unit, such as an air conditioner, on a machining accuracy of the machine tool.

SUMMARY OF THE INVENTION

In order to achieve the above-described object, a first configuration of the disclosure is a machining accuracy diagnosing device for a machine tool. The machining accuracy diagnosing device predicts and diagnoses an influence on a machining accuracy in a plant where the machine tool is installed when a machine body temperature of the machine tool is changed by a temperature regulating unit that affects the machine body temperature. The machining accuracy diagnosing device includes a temperature regulation operating pattern setting unit, a cutting condition setting unit, a temperature information acquiring unit, and a machining accuracy influence amount predicting unit. The temperature regulation operating pattern setting unit sets an operating pattern of the temperature regulating unit. The cutting condition setting unit sets at least a scheduled machining start time and a scheduled machining end time by the machine tool. The temperature information acquiring unit acquires an influencing temperature of the temperature regulating unit on the machine body temperature and/or an air temperature outside the plant. The machining accuracy influence amount predicting unit predicts an influence amount of the temperature regulating unit on the machining accuracy based on the operating pattern of the temperature regulating unit acquired from the temperature regulation operating pattern setting unit, the scheduled machining start time and the scheduled machining end time acquired from the cutting condition setting unit, and at least one of the influencing temperature and/or the air temperature outside the plant acquired from the temperature information acquiring unit and a set temperature of the temperature regulating unit acquired from the temperature regulation operating pattern setting unit.

It should be noted that "influencing temperature" in the disclosure means a temperature that affects the machine body temperature of the machine tool, such as a room temperature inside the plant controlled with an air conditioner and a set temperature of a temperature regulating device directly installed on the machine tool, for example, an oil jacket.

Another aspect of the first configuration of the disclosure, which is in the above configuration, further includes a schedule changing unit that changes at least one of the operating pattern of the temperature regulating unit set by the temperature regulation operating pattern setting unit and the scheduled machining start time set by the cutting condition setting unit based on the predicted influence amount on the machining accuracy.

In another aspect of the first configuration of the disclosure, which is in the above configuration, the schedule changing unit changes the operating pattern of the temperature regulating unit based on a comparison between the influence amount on the machining accuracy predicted by the machining accuracy influence amount predicting unit and a preset acceptable value of the influence amount during a cutting time acquired from the cutting condition setting unit.

In another aspect of the first configuration of the disclosure, which is in the above configuration, the schedule changing unit: predicts consumption energy of the temperature regulating unit using the influencing temperature, the set temperature of the temperature regulating unit, and the air temperature outside the plant; and changes the operating pattern of the temperature regulating unit such that a condition in which the influence amount on the machining accuracy is smaller than the acceptable value is satisfied and the consumption energy of the temperature regulating unit becomes minimum.

In another aspect of the first configuration of the disclosure, which is in the above configuration, the schedule changing unit changes the scheduled machining start time such that the influence amount on the machining accuracy predicted by the machining accuracy influence amount predicting unit becomes smaller than the preset acceptable value of the influence amount during the cutting time acquired from the cutting condition setting unit.

In another aspect of the first configuration of the disclosure, which is in the above configuration, the temperature information acquiring unit includes a room temperature sensor measuring a room temperature inside the plant that becomes the influencing temperature and an outside air temperature sensor measuring the air temperature outside the plant, and the machining accuracy influence amount predicting unit estimates a room temperature change inside the plant during the cutting time acquired from the cutting condition setting unit by a preset room temperature change estimation formula based on a current room temperature inside the plant measured with the room temperature sensor and the set temperature of the temperature regulating unit or the air temperature outside the plant, estimates a machine body temperature change of the machine tool by a preset machine body temperature change estimation formula based on the estimated room temperature change inside the plant, and estimates a thermal displacement of the machine tool by a preset thermal displacement estimation formula based on the predicted machine body temperature change of the machine tool to obtain a change amount of the thermal displacement during the cutting time as an influence amount on a machining accuracy.

In another aspect of the first configuration of the disclosure, which is in the above configuration, the temperature regulating unit is an air conditioner installed inside the plant, and when estimating the room temperature change by the room temperature change estimation formula, the machining accuracy influence amount predicting unit estimates the room temperature change inside the plant using a set temperature of the air conditioner as an input when a power source of the air conditioner is turned on and using the air temperature outside the plant as an input when the power source of the air conditioner is turned off.

In another aspect of the first configuration of the disclosure, which is in the above configuration, the machining accuracy influence amount predicting unit compares a temperature measured with the room temperature sensor with the room temperature change estimated by the room temperature change estimation formula to modify the room temperature change estimation formula.

Another aspect of the first configuration of the disclosure, which is in the above configuration, further includes a machine body temperature sensor that measures the machine body temperature of the machine tool. The machining accuracy influence amount predicting unit compares a temperature measured with the machine body temperature sensor with the machine body temperature estimated by the machine body temperature change estimation formula to modify the machine body temperature change estimation formula.

In order to achieve the above-described object, a second configuration of the disclosure is a machining accuracy diagnosing method for a machine tool. The machining accuracy diagnosing method predicts and diagnoses an influence on a machining accuracy in a plant where the machine tool is installed when a machine body temperature of the machine tool is changed by a temperature regulating unit that affects the machine body temperature. The machining accuracy diagnosing method includes: acquiring an operating pattern of the temperature regulating unit; acquiring at least a scheduled machining start time and a scheduled machining end time by the machine tool; acquiring at least one of an influencing temperature of the temperature regulating unit on the machine body temperature and/or an air temperature outside the plant and a set temperature of the temperature regulating unit; and predicting an influence amount of the temperature regulating unit on the machining accuracy based on the acquired operating pattern of the temperature regulating unit, the acquired scheduled machining start time and scheduled machining end time, and at least one of the acquired influencing temperature and/or the air temperature outside the plant, and the set temperature of the temperature regulating unit.

Another aspect of the second configuration of the disclosure, which is in the above configuration, further includes changing at least one of the operating pattern of the temperature regulating unit acquired by the acquiring of the operating pattern and the scheduled machining start time acquired by the acquiring of the scheduled machining start time and the scheduled machining end time based on the predicted influence amount on the machining accuracy.

With the disclosure, the influence of the temperature regulating unit on the machining accuracy can be quantitatively predicted using information, such as the operating pattern of the temperature regulating unit, for example information on times to switch on or off a power source and to change a set temperature for an air conditioner, the scheduled machining start time and the scheduled machining end time, and the influencing temperature.

With another aspect of the disclosure, in addition to the above effect, by employing the schedule changing unit, according to the predicted influence on the machining accuracy, the operating pattern of the temperature regulating unit and/or a machining schedule to maintain the machining accuracy can be appropriately and easily changed.

With another aspect of the disclosure, when a time to machine a workpiece is predetermined, the operating pattern of the temperature regulating unit is changed by the schedule changing unit such that a required accuracy of the workpiece can be satisfied. Therefore, in addition to the above effects, the machining accuracy can be ensured by stabilizing the temperature of a machine before the machining start, for example, by operating the temperature regulating unit in advance, when a machining that requires high accuracy is planned. In this case, when the machining that requires high accuracy is not planned, energy can be saved by turning off the temperature regulating unit or by expanding a width of the set temperature.

With another aspect of the disclosure, in addition to the above effects, since the operating pattern of the temperature regulating unit is changed to decrease the consumption energy of the temperature regulating unit, the operating pattern of the temperature regulating unit can be decided so as to satisfy the required accuracy while saving the consumption energy.

With another aspect of the disclosure, the schedule changing unit changes the scheduled machining start time such that the influence amount on the machining accuracy becomes smaller than the acceptable value. Therefore, in addition to the above effects, the machining schedule can be created considering the influence on the machining accuracy by predicting a period until the influence amount of the temperature regulating unit on the machining accuracy becomes equal to or less than the acceptable value. This is effective when the operating pattern of the temperature regulating unit is predetermined.

With another aspect of the disclosure, the room temperature change inside a plant by the temperature regulating unit is estimated by a calculation using a physical model, and a machine body temperature change of a machine tool is estimated based on the room temperature change. Further, a thermal displacement of the machine tool is estimated based on the machine body temperature change to obtain the influence amount on the machining accuracy. Therefore, in addition to the above effects, an influence on an actual workpiece accuracy can be accurately estimated.

With another aspect of the disclosure, in addition to the above effects, by changing a prediction method of the room temperature change according to a state of the power source of the air conditioner, the room temperature change inside the plant can be predicted with accuracy.

With another aspect of the disclosure, in addition to the above effects, since the estimation result of the room temperature is compared with an actual measurement result to correct the room temperature change estimation formula, an accuracy of the prediction can be enhanced.

With another aspect of the disclosure, in addition to the above effects, since the estimation result of the machine body temperature change is compared with an actual measurement result to correct the machine body temperature change estimation formula, an accuracy of the prediction can be enhanced.

DETAILED DESCRIPTION OF THE INVENTION

The following describes Embodiment 1 as one of embodiments of the disclosure based on the drawings.

Figure 1A:
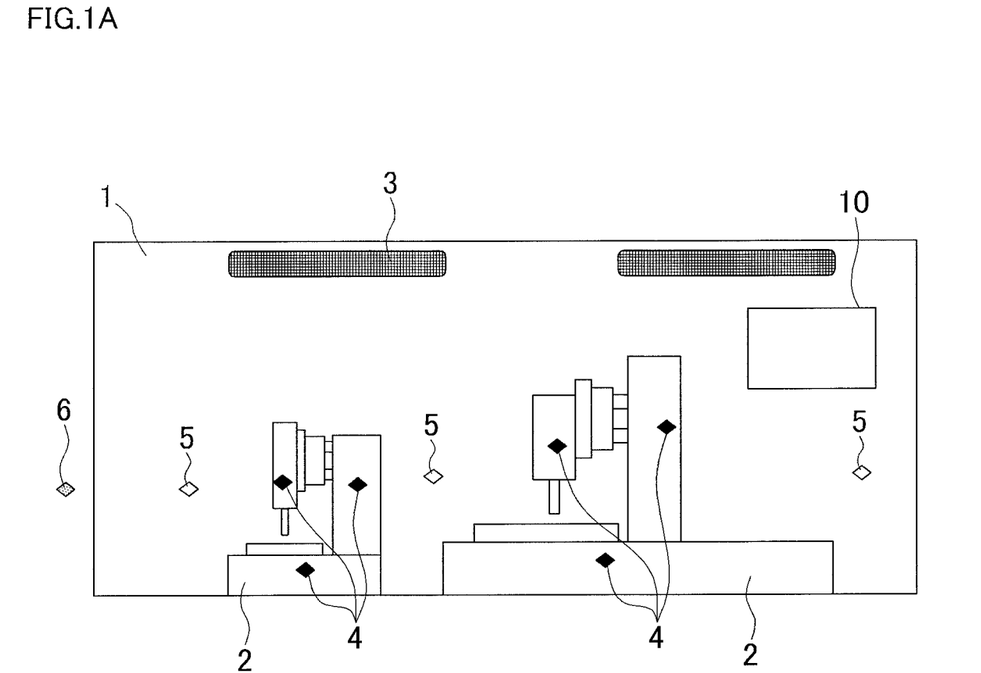
FIG. 1A is a conceptual diagram of a plant where a machine tool is installed.
Figure 1B:
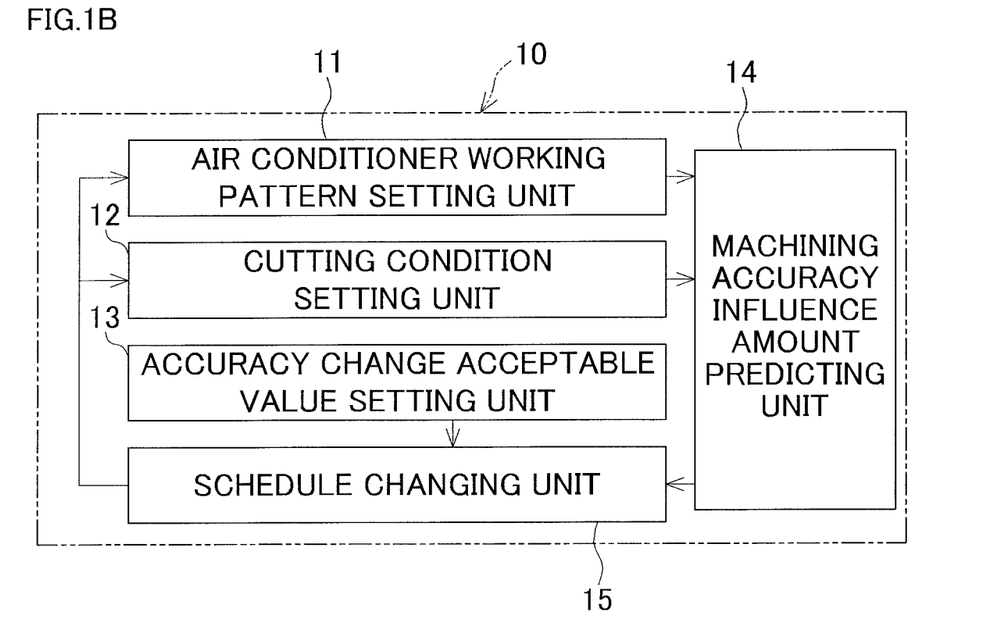
FIG. 1B is a conceptual diagram of a machining accuracy diagnosing device.

FIG. 1A and FIG. 1B illustrate one example of a plant where a machining accuracy diagnosing device according to a first configuration of the disclosure is installed and a machining accuracy diagnosing device.

In a plant 1, machine tools 2, 2 and an air conditioner 3, which controls a temperature inside a plant 1, are disposed. The air conditioner 3 is one example of a temperature regulating unit of the disclosure.

In respective parts of the machine tools 2, 2, a plurality of machine body temperature sensors 4, 4 . . . are installed. In the plant 1, a plurality of room temperature sensors 5, 5 . . . are installed. Outside the plant 1, an outside air temperature sensor 6 is installed. The room temperature sensor 5 and the outside air temperature sensor 6 are exemplified by a temperature information acquiring unit of the disclosure. The room temperature acquired by the room temperature sensor 5 is one example of an influencing temperature of the disclosure.

A machining accuracy diagnosing device 10 acquires information of the respective temperature sensors 4 to 6 and performs an analysis based on the information to decide a machining schedule of the machine tool 2 and decide a working pattern of the air conditioner 3. The machining accuracy diagnosing device 10 may be installed separately from the machine tool 2 or may cause an NC device of the machine tool 2 to double as a part or all of functions of the machining accuracy diagnosing device 10. The machining accuracy diagnosing device 10 need not be installed inside the plant 1. The machining accuracy diagnosing device 10 includes a central processing unit (CPU) and a memory connected to the CPU and ensures the operations.

Specifically, the machining accuracy diagnosing device 10 includes an air conditioner working pattern setting unit 11, a cutting condition setting unit 12, an accuracy change acceptable value setting unit 13, a machining accuracy influence amount predicting unit 14, and a schedule changing unit 15.

The air conditioner working pattern setting unit 11 sets the working pattern, such as a time point to turn on and off the air conditioner 3 and a set temperature. The setting of the working pattern is performed by an input unit that is not illustrated and by a command from the schedule changing unit 15. The air conditioner working pattern setting unit 11 is one example of a temperature regulation operating pattern setting unit of the disclosure.

The cutting condition setting unit 12 sets at least a scheduled machining start time and a scheduled machining end time based on a machining program in the machine tool 2. The setting is also performed by an input unit that is not illustrated and by a command from the schedule changing unit 15. The cutting condition setting unit 12 is one example of a cutting condition setting unit of the disclosure.

The accuracy change acceptable value setting unit 13 sets an acceptable value of an accuracy change of the machine tool 2 during a cutting time set by the cutting condition setting unit 12. The setting is also performed by an input unit that is not illustrated.

The machining accuracy influence amount predicting unit 14 predicts an influence amount of the air conditioner 3 on a machining accuracy based on the working pattern of the air conditioner 3 set by the air conditioner working pattern setting unit 11, the scheduled machining start time and the scheduled machining end time set by the cutting condition setting unit 12, and the information of the respective temperature sensors 4 to 6. The machining accuracy influence amount predicting unit 14 is one example of a machining accuracy influence amount predicting unit of the disclosure.

The schedule changing unit 15 changes, or resets, any of the working pattern by the air conditioner working pattern setting unit 11 and the scheduled machining start time by the cutting condition setting unit 12 based on the influence amount on the machining accuracy predicted by the machining accuracy influence amount predicting unit 14 and the acceptable value set by the accuracy change acceptable value setting unit 13. The schedule changing unit 15 is one example of a schedule changing unit of the disclosure.

In Embodiment 1, taking a case where the machining schedule on the machine tool 2 side is decided in advance by the cutting condition setting unit 12 as an example, the machining accuracy influence amount predicting unit 14 predicts the influence amount of the air conditioner 3 on the machining accuracy, and the schedule changing unit 15 changes the working pattern of the air conditioner 3 such that the accuracy can be ensured for the prediction.

Usually, the machining has a phase of rough machining that does not require a high machining accuracy and a phase of finish machining that requires a high machining accuracy. Therefore, as long as a temperature change of the machine tool 2 decreases at the timing of the finish machining, a required accuracy of a workpiece can be satisfied.

Figure 3:
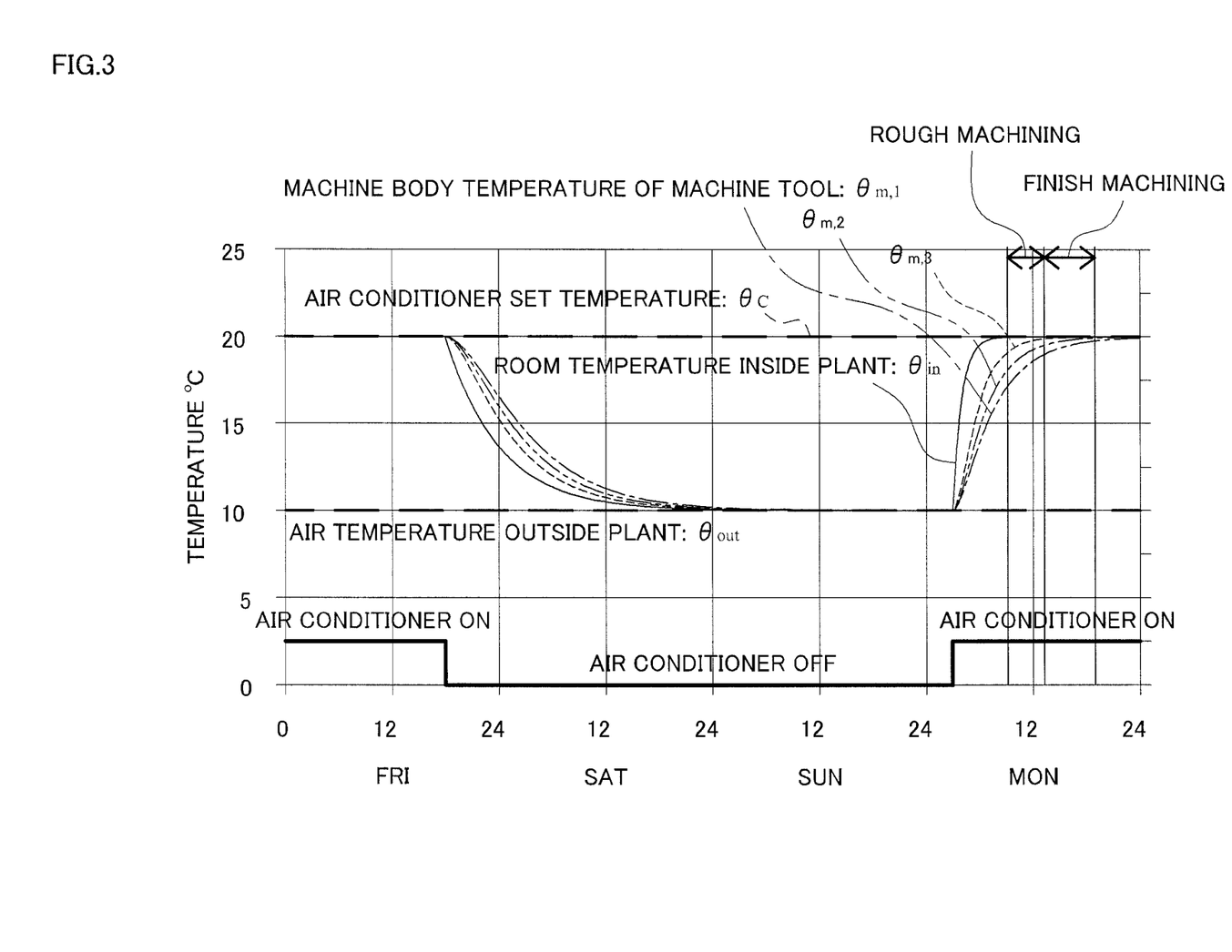
FIG. 3 is a graph that represents a temperature change prediction result when the power-on time of the air conditioner is decided.

However, as illustrated in FIG. 3, a machine body temperature of the machine tool 2 changes with a delay from a change of the room temperature inside the plant 1. Therefore, even when a room temperature change is stabilized, the temperature change of the machine tool 2 continues, and the accuracy becomes unstable in some cases. Therefore, the room temperature change inside the plant 1 as well as the machine body temperature change of the machine tool 2 need monitoring and predicting.

Figure 2:
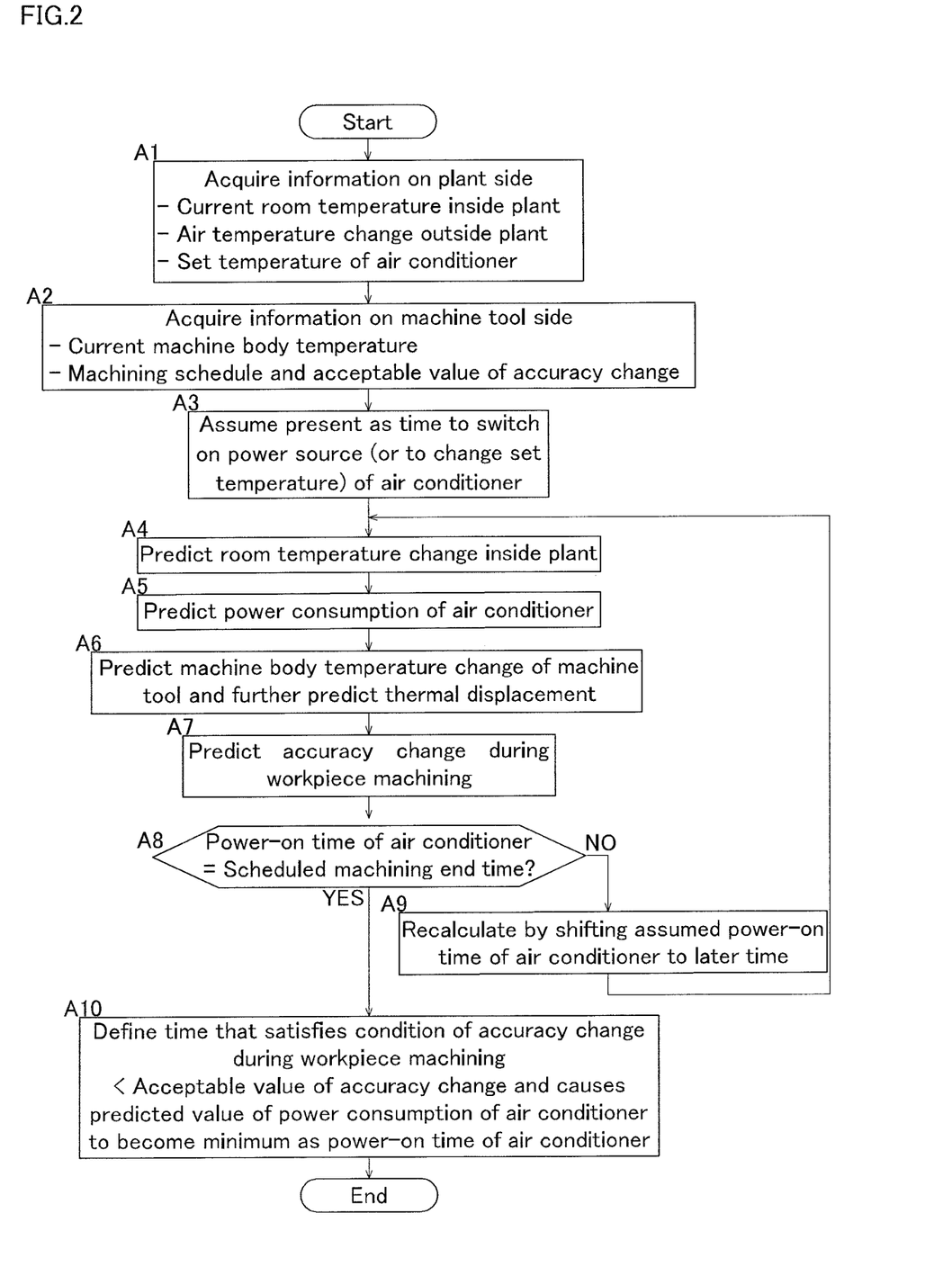
FIG. 2 is a flowchart of a machining accuracy diagnosing method according to Embodiment 1 of deciding a power-on time of an air conditioner.
Figure 4:
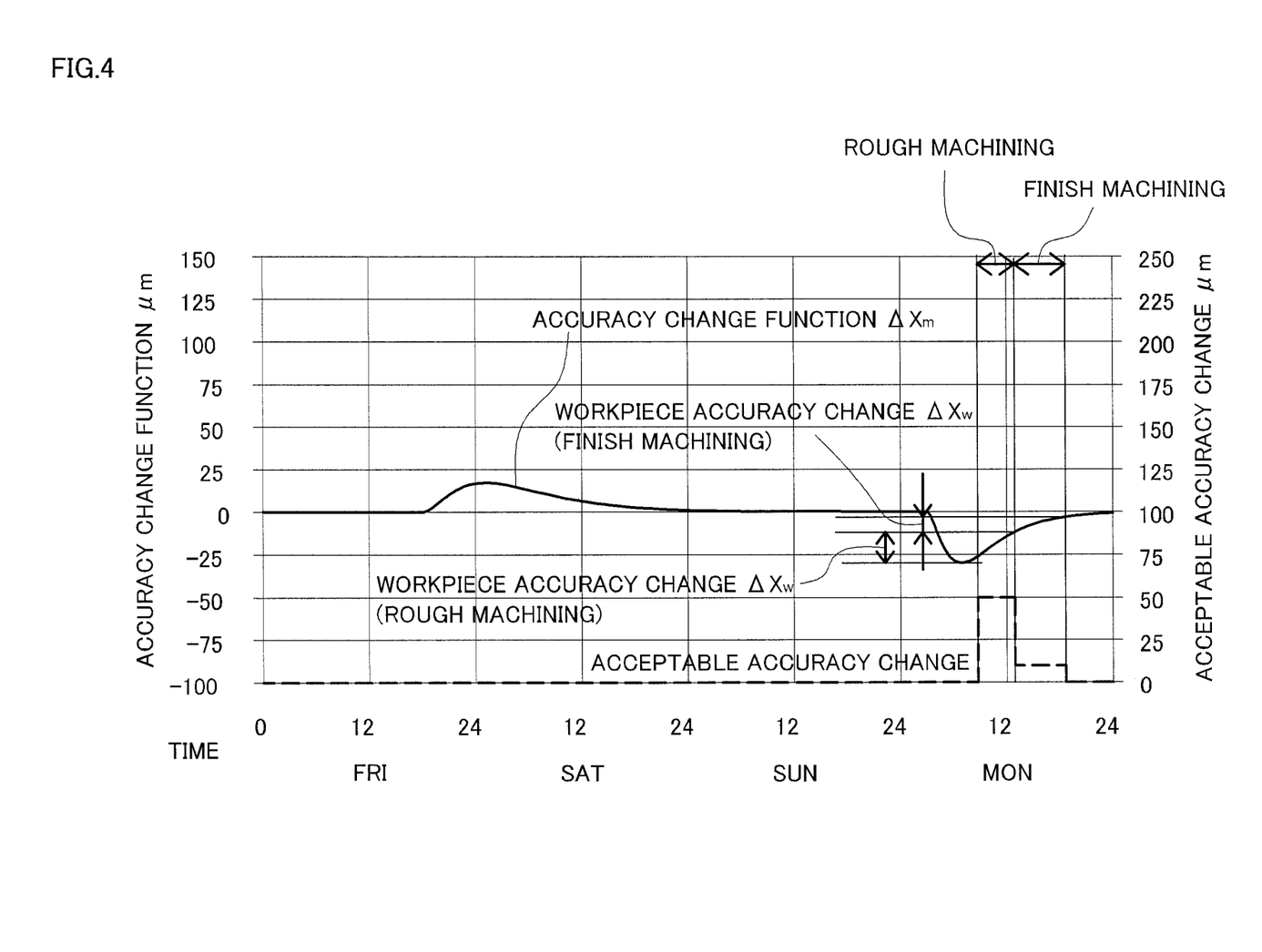
FIG. 4 is a graph that represents a calculation result of an accuracy change function when the power-on time of the air conditioner is decided.

The following describes a machining accuracy diagnosing method in which the machining accuracy influence amount predicting unit 14 predicts the accuracy change of the machine tool 2 and the schedule changing unit 15 decides a time point to switch on the power source of the air conditioner 3, using a flowchart of FIG. 2 and graphs of FIG. 3 and FIG. 4.

Phase A1: Acquiring information on the plant 1 side, namely temperature regulation operating pattern acquiring step and temperature information acquiring step.

As the information on the plant 1 side, the current room temperature inside the plant 1, the air temperature outside the plant 1, and power on/off and the set temperature of the air conditioner 3 are acquired. As the room temperature inside the plant 1, a current value measured with the room temperature sensor 5 disposed in the plant 1 is used. While the air temperature outside the plant 1 is measured with the outside air temperature sensor 6 in Embodiment 1, outside data, such as meteorological data, can be used. Furthermore, not only the current value, but also a forecast value of a future change may be used as necessary. For the information on the power on/off and the set temperature of the air conditioner 3, not only the current information, but also information on future setting contents from the schedule of the air conditioner 3 is used as necessary.

Phase A2: Acquiring information on the machine tool 2 side, namely cutting condition acquiring step.

As the information on the machine tool 2 side, the current machine body temperature, the machining schedule, and the acceptable value of the accuracy change, which is an acceptable accuracy change, are acquired. The information on the machining schedule and the acceptable accuracy change are preset in the machine tool 2, for example, as illustrated in FIG. 4. First, for machining programs prepared according to types of workpieces to be machined and the machining phases such as the rough machining and the finish machining, required machining accuracies for them are set. Furthermore, by setting in the machine tool 2 at which time slot an execution of each machining program is planned, the acceptable accuracy change of the machine tool 2 in each time slot is set. In the example of FIG. 4, the acceptable accuracy change from 9:00 to 13:00 on Monday is set to 50 µm for performing the rough machining, and the acceptable accuracy change from 13:00 to 19:00 is set to 10 µm for performing the finish machining.

Phase A3: Assuming that the present is a power-on time, or a time to change the set temperature, of the air conditioner 3. Subsequently, the power-on time is changed between the present and the machining end to perform calculations of Phases A4 to A7, and the influence of a thermal displacement on the machining accuracy is predicted.

Phase A4: Predicting the room temperature change inside the plant 1 in association with the on/off and the setting change of the air conditioner 3.

The room temperature change inside the plant 1 when the air conditioner 3 is turned off is predicted. When the air conditioner 3 is turned off, a room temperature: $\theta_{in}$ inside the plant 1 is expressed by a first-order lag change in which an air temperature: $\theta_{out}$ outside the plant 1 is used as an input as expressed in the following Formula 1. Formula 1 is one example of a room temperature change estimation formula (when air conditioner power is off) of the disclosure.

$$\theta_{in}(n) = \theta_{in}(n-1) + \frac{\Delta t}{\Delta t + T_{off}}\{\theta_{out}(n) - \theta_{in}(n-1)\} \qquad \text{(Formula 1)}$$

$\theta_{in}(n)$: Room temperature inside plant, where n=0 is a current temperature (measured value)

$\theta_{out}(n)$: Air temperature outside plant $T_{off}$: Time constant of room temperature change inside plant when air conditioner is off $\Delta t$: Cycle of calculation On the other hand, when the air conditioner 3 is turned on, the room temperature: $\theta_{in}$ inside the plant 1 is expressed by a first-order lag change in which a set temperature: $\theta_C$ of the air conditioner 3 is used as an input as expressed in the following Formula 2. Formula 2 is one example of a room temperature change estimation formula (when air conditioner power is on) of the disclosure.

$$\theta_{in}(n) = \theta_{in}(n-1) + \frac{\Delta t}{\Delta t + T_{on}}\{\theta_c(n) - \theta_{in}(n-1)\} \quad \text{(Formula 2)}$$

$\theta_{in}$ (n): Room temperature inside plant, where n=0 is a current temperature (measured value)
$\theta_C$(n): Set temperature of air conditioner
$T_{on}$: Time constant of room temperature change inside plant when air conditioner is on
$\Delta t$: Cycle of calculation In Formula 1 and Formula 2, following capability of the room temperature change for an input temperature is expressed by the values of the time constants $T_{off}$ and $T_{on}$. The smaller the time constant value, the quicker the change is. Usually, since the room temperature quickly changes when the air conditioner 3 is on, $T_{off}$ is much greater than $T_{on}$. In addition, the values vary depending on an area of a space inside the plant 1, heat insulating properties of the plant 1, an output of the air conditioner 3, and the like. As long as the values are identified in advance, the room temperature change can be predicted.

When the air conditioner 3 is on, it is also considered that the room temperature change is affected by the outside air temperature. In order to deal with this, a predicted value of the change in air temperature is taken in, and the value of the time constant $T_{on}$ is modified based on the predicted value. For example, when the change in using heating in winter is predicted, a method of modifying the value such that the time constant $T_{on}$ increases is considered because the lower the outside air temperature is, the harder the room temperature increases. In Embodiment 1, while Formula 1 and Formula 2 are used for the prediction, another formula may be used for the prediction based on a measurement result.

Phase A5: Predicting a power consumption of the air conditioner 3. For example, the power consumption can be approximated by the following Formula 3. The first term of Formula 3 is a power consumption required when the air conditioner 3 is started, and the second term is a power consumption required to keep the room temperature inside the plant 1 at a constant temperature when the room temperature is subject to the influence of the air temperature outside the plant 1.

$$P = c_1(\theta_c - \theta_{in0}) + \int c_2(\theta_c - \theta_{out}(t))dt \quad \text{(Formula 3)}$$

$\theta_{in0}$: Initial value of room temperature inside plant
$\theta_C$: Set temperature of air conditioner
$\theta_{out}(t)$: Air temperature outside plant
$c_1, c_2$: Constants Phase A6: Predicting the machine body temperature change and the thermal displacement of the machine tool 2 after the power source of the air conditioner 3 is switched on. When the room temperature in the environment where the machine tool 2 is placed changes, the machine body temperature changes with a delay from the room temperature change. The machine body temperature change at this time can be expressed by a first-order lag response in which the room temperature change is used as an input. The response can be obtained by successively calculating using a difference equation as expressed in the following Formula 4. Formula 4 is one example of a machine body temperature change estimation formula of the disclosure.

$$\theta_{m,i}(n) = \theta_{m,i}(n-1) + \frac{\Delta t}{\Delta t + T_{m,i}}\{\theta_c(n) - \theta_{m,i}(n-1)\} \quad \text{(Formula 4)}$$

i=1, 2, ..., N
$\theta_{in}$(n): Room temperature inside plant, where n=0 is a current temperature (measured value)
$\theta_{in}$(n): Machine body temperature of machine tool, where n=0 is a current temperature, that is, measured value.
$T_{m,i}$: Time constant of machine body temperature change with respect to room temperature change
$\Delta t$: Cycle of calculation
(i is a subscript representing a temperature sensor position)

The calculation of Formula 4 is performed for each machine tool 2 and each temperature measuring point to estimate the machine body temperature change for each part when the room temperature changes predicted by Formula 1 and Formula 2 occur. Furthermore, from the estimated machine body temperature changes of the machine tool 2, the accuracy change due to the thermal displacement of the machine tool 2 is predicted. The accuracy change can be expressed by a function of the machine body temperature as expressed in the following Formula 5. Hereinafter, the function is referred to as an accuracy change function of the machine tool 2. What sort of function the accuracy change function should be is decided in advance based on an experiment and an analysis.

$$\Delta X_m = F(\theta_{m,1}, \theta_{m,2}, \ldots, \theta_{m,N}) \quad \text{(Formula 5)}$$

$\Delta X_m$: Accuracy change function of machine tool

Specifically, the accuracy change function can be expressed by a linear formula of the temperature of each part of the machine tool 2, for example, as expressed in the following Formula 6.

$$\Delta X_m = k_0 + k_1\theta_{m,1} + k_2\theta_{m,2} + \ldots + k_N\theta_{m,N} \quad \text{(Formula 6)}$$

$k_0, k_1, k_2, \ldots, k_N$: Constants
$N$: Number of measured or estimated temperatures By this method, the thermal displacement of the machine tool 2 is estimated by mounting temperature sensors on a plurality of structures of the machine tool 2, such as a bed, a column, and a main spindle, multiplying the temperatures of the structures by preset constant of proportions, and adding them together. The constant of proportion can be identified by obtaining a relationship between the temperature and the thermal displacement by an FEM analysis or an actual measurement.

In Embodiment 1, while the temperature change of the machine body is predicted using the current temperature information by installing the machine body temperature sensors 4 on the machine tool 2, a machine body temperature sensor is not necessarily installed to predict the accuracy change of a machine tool. Additionally, as the accuracy change function of the machine tool, a formula other than the linear formula shown in Formula 6 can be considered. Furthermore, a variable other than the machine body temperature, for example, a variation of the room temperature around the machine can be used.

Phase A7: Predicting the accuracy change of the machine tool 2 during a workpiece machining. For the accuracy change function of the machine tool 2 obtained in Phase A6, by calculating a width of the change at the time slot corresponding to the machining schedule set in Phase A2, the accuracy change of the machine tool 2 during each workpiece machining can be predicted and estimated as expressed in the following Formula 7. Formula 5 to Formula 7 are exemplified by a thermal displacement estimation formula of the disclosure, and the accuracy change obtained in Formula 7 is one example of a change amount of the thermal displacement, which is an influence amount on the machining accuracy, during the cutting time.

$$\Delta X_w = \max_{t_{w,start} \le t \le t_{w,end}} (\Delta X_m) - \min_{t_{w,start} \le t \le t_{w,end}} (\Delta X_m) \quad \text{(Formula 7)}$$

$\Delta X_w$: Accuracy change during workpiece machining
$t_{w,start}$: Machining start time of workpiece
$t_{w,end}$: Machining end time of workpiece Phase A8: Determining whether or not the calculations end for all the power-on times. When the power-on time becomes equal to the scheduled machining end time, the calculation ends.

Phase A9: When the power-on time is not equal to the scheduled machining end time in the determination in Phase A8, shift the assumed power-on time of the air conditioner 3 to a later time, and repeat the calculations in Phase A4 to Phase A7. Phase A3 to Phase A9 are regarded as a machining accuracy influence amount predicting step of the disclosure.

Phase A10: Define a time that satisfies a condition in which the accuracy change during the workpiece machining is less than the acceptable value of the accuracy change, which is the acceptable accuracy change, and that causes the predicted value of the power consumption of the air conditioner 3 to become minimum as the power-on time of the air conditioner 3, namely schedule changing step.

Based on the above flow, an example of deciding a time point to switch on the power source of the air conditioner 3 is illustrated in FIG. 3. In the example, when the power source of the air conditioner 3 is turned off on Friday night, in order to ensure the accuracy in machining to be performed on Monday after a weekend break, at which time point the air conditioner 3 should be started is obtained. In this simulation, for easy understanding of the result, the set temperature of air conditioner $\theta_C$ is assumed to be constant at 20° C., and the air temperature $\theta_{out}$ outside the plant 1 is assumed to be constant at 10° C. In addition, by setting the time constant of room temperature change when air conditioner is off $T_{off}$ to 360 minutes and the time constant of room temperature change inside plant 1 when air conditioner is on $T_{on}$ to 60 minutes, the calculations are performed based on Formula 1 and Formula 2. These values are identified in advance from an experiment and a calculation.

When the air conditioner 3 is turned off in the evening of Friday, the room temperature Om inside the plant 1 gradually decreases by the influence of the outside air temperature. With a delay from the room temperature change, the machine body temperatures $\theta_{m,1}$, $\theta_{m,2}$, $\theta_{m,3}$ at respective parts decrease. Since a degree of delay from the room temperature change differs depending on the parts and the difference of the degree of delay causes a temperature difference in the machine, the thermal displacement occurs. The degree of delay can be expressed by the time constant shown in Formula 4. In the example of FIG. 3, by setting the time constants $T_{m,1}$, $T_{m,2}$, $T_{m,3}$ of the machine body temperature change to 240 minutes, 180 minutes, and 120 minutes, respectively, the calculation is performed based on Formula 4. The values of the time constants of the machine body temperature change are also identified in advance from an experiment and a calculation.

On the other hand, when the power source of the air conditioner 3 is switched on, the room temperature $\theta_{in}$ inside the plant 1 first increases so as to approach the set temperature, and the machine body temperatures $\theta_{m,1}$, $\theta_{m,2}$, $\theta_{m,3}$ increase with a delay. Here, a problem is that, even when the room temperature returns to an original temperature and becomes constant, the machine body temperature change continues, and the machining accuracy becomes unstable in some cases. Therefore, it is necessary to switch on the power source of the air conditioner 3 well in advance before the machining is performed. In addition, although the power consumption of the air conditioner 3 is obtained by Formula 3, in the example, the room temperature when the power source of the air conditioner 3 is switched on is 10° C., and the power consumption at the startup is constant regardless of the power-on time. Since the outside air temperature is assumed to be constant at 10° C., the power consumption of the air conditioner 3 is calculated to be long according to a period during which the power source is kept on. Therefore, the power-on time may be delayed as late as possible within a range where the machining accuracy can be satisfied.

In the example of FIG. 4, the acceptable accuracy change from 9:00 to 13:00 on Monday is set to 50 µm for performing the rough machining, and the acceptable accuracy change from 13:00 to 19:00 is set to 10 µm for performing the finish machining. Additionally, in the example, the accuracy change function $\Delta X_m$ of the machine tool 2 is calculated by the following Formula 8 using the machine body temperatures at three points.

$$\Delta X_m = 10 \times \theta_{m,1} + 5 \times \theta_{m,2} - 15 \times \theta_{m,3} \quad \text{(Formula 8)}$$

At this time, when the workpiece accuracy change $\Delta X_w$ is calculated in accordance with the method of the flowchart in FIG. 2, it can be seen that the accuracy change falls within the acceptable accuracy change for both the rough machining and the finish machining when the power source of the air conditioner 3 is turned on at 3:00 a.m. on Monday. By setting the power source of the air conditioner 3 to be automatically switched on based on the determination result, the air conditioner 3 in the plant 1 is automatically started at 3:00 a.m. before the start of work on Monday, and the machining can be started after the start of work in a state where the temperature change of the machine is stabilized.

While the accuracy change function is obtained in Formula 5 assuming that it is simply proportionate to the machine body temperature at a certain position, the formula of the accuracy change function can be set arbitrarily. For example, a formula of variations of the room temperatures and the machine body temperatures at a plurality of points, a differential value of the temperature change, or the like can be considered.

Thus, the machining accuracy diagnosing device 10 of the machine tool 2 of the above Embodiment 1 includes the air conditioner working pattern setting unit 11, the cutting condition setting unit 12, the room temperature sensor 5 and the outside air temperature sensor 6, and the machining accuracy influence amount predicting unit 14 and performs the above machining accuracy diagnosing method. The air conditioner working pattern setting unit 11 sets the operating pattern of the air conditioner 3. The cutting condition setting unit 12 sets the scheduled machining start time and the scheduled machining end time by the machine tool 2. The room temperature sensor 5 and the outside air temperature sensor 6 obtain the room temperature inside the plant 1 caused by the air conditioner 3 and the air temperature outside the plant 1. The machining accuracy influence amount predicting unit 14 predicts the influence amount of the air conditioner 3 on the machining accuracy based on the operating pattern of the air conditioner 3 acquired from the air conditioner working pattern setting unit 11, the scheduled machining start time and the scheduled machining end time acquired from the cutting condition setting unit 12, the room temperature inside the plant 1 and the air temperature outside the plant 1 acquired from the room temperature sensor 5 and the outside air temperature sensor 6, and the set temperature of the air conditioner 3 acquired from the air conditioner working pattern setting unit 11.

With the configuration, using the information, such as the operating pattern of the air conditioner 3, the scheduled machining start time and the scheduled machining end time, and the room temperature inside the plant 1, the influence of the air conditioner 3 on the machining accuracy can be quantitatively predicted.

In particular, the schedule changing unit 15 that changes the operating pattern of the air conditioner 3 set by the air conditioner working pattern setting unit 11 based on the predicted influence amount on the machining accuracy is further provided. Therefore, according to the predicted influence on the machining accuracy, the operating pattern of the air conditioner 3 can be appropriately and easily changed to maintain the machining accuracy.

In addition, the schedule changing unit 15 changes the operating pattern of the air conditioner 3 based on the comparison between the influence amount on the machining accuracy predicted by the machining accuracy influence amount predicting unit 14 and the preset acceptable value of the accuracy change during the cutting time acquired from the cutting condition setting unit 12. Therefore, the machining accuracy can be ensured by stabilizing the temperature of the machine before the machining start, for example, by operating the air conditioner 3 in advance, when the machining that requires high accuracy is planned. In this case, when the machining that requires high accuracy is not planned, energy can be saved by turning off the air conditioner 3 or by expanding a width of the set temperature.

Furthermore, the schedule changing unit 15 predicts the power consumption, which is the consumption energy, of the air conditioner 3 using the room temperature inside the plant 1, the set temperature of the air conditioner 3, and the air temperature outside the plant 1. Then, the schedule changing unit 15 changes the operating pattern of the air conditioner 3 such that the condition in which the influence amount on the machining accuracy is smaller than the acceptable value of the accuracy change is satisfied and the predicted value of the consumption energy of the air conditioner 3 becomes minimum. Therefore, the schedule changing unit 15 can decide the operating pattern of the air conditioner 3 so as to satisfy the required accuracy while saving the consumption energy.

The machining accuracy influence amount predicting unit 14 estimates the room temperature change inside the plant 1 during the cutting time acquired from the cutting condition setting unit 12 by the preset room temperature change estimation formula, based on the current room temperature inside the plant 1 measured with the room temperature sensor 5 and the air temperature outside the plant 1. In addition, the machining accuracy influence amount predicting unit 14 estimates the machine body temperature change of the machine tool 2 by the preset machine body temperature change estimation formula based on the estimated room temperature change inside the plant 1, and estimates the thermal displacement of the machine tool 2 by the preset thermal displacement estimation formula based on the predicted machine body temperature change of the machine tool 2. Then, the machining accuracy influence amount predicting unit 14 obtains the change amount of the thermal displacement during the cutting time as the influence amount on the machining accuracy.

That is, the influence amount on the machining accuracy is obtained by estimating the room temperature change inside the plant 1 by the air conditioner 3 by the calculation using a physical model, estimating the machine body temperature change of the machine tool 2 based on the room temperature change, and further estimating the thermal displacement of the machine tool 2 based on the machine body temperature change. Therefore, the influence on an actual workpiece accuracy can be accurately estimated.

In particular, when estimating the room temperature change by the room temperature change estimation formula, the machining accuracy influence amount predicting unit 14 estimates the room temperature change inside the plant 1 using the set temperature of the air conditioner 3 as an input when the power source of the air conditioner 3 is turned on and using the air temperature outside the plant 1 as an input when the power source of the air conditioner 3 is turned off. Therefore, the room temperature change inside the plant 1 can be predicted with accuracy.

Embodiment 2 of the disclosure is described below.

In the above Embodiment 1, the method in which the machining schedule is predetermined and the power source of the air conditioner 3 is switched on in advance to ensure the required accuracy based on the machining schedule has been described. On the other hand, there may be a case where a time to switch on the power source of the air conditioner 3 is already determined and the scheduled machining start time is determined with respect to the time. In that case, it is only necessary to obtain a period required until the room temperature is stabilized and the required accuracy can be ensured. The following describes a specific example according to a second configuration of the disclosure. However, since the configuration of the machining accuracy diagnosing device 10 is the same as that of the above Embodiment 1, a machining accuracy diagnosing method that has a different process will be described based on the flowchart of FIG. 5.

Figure 5:
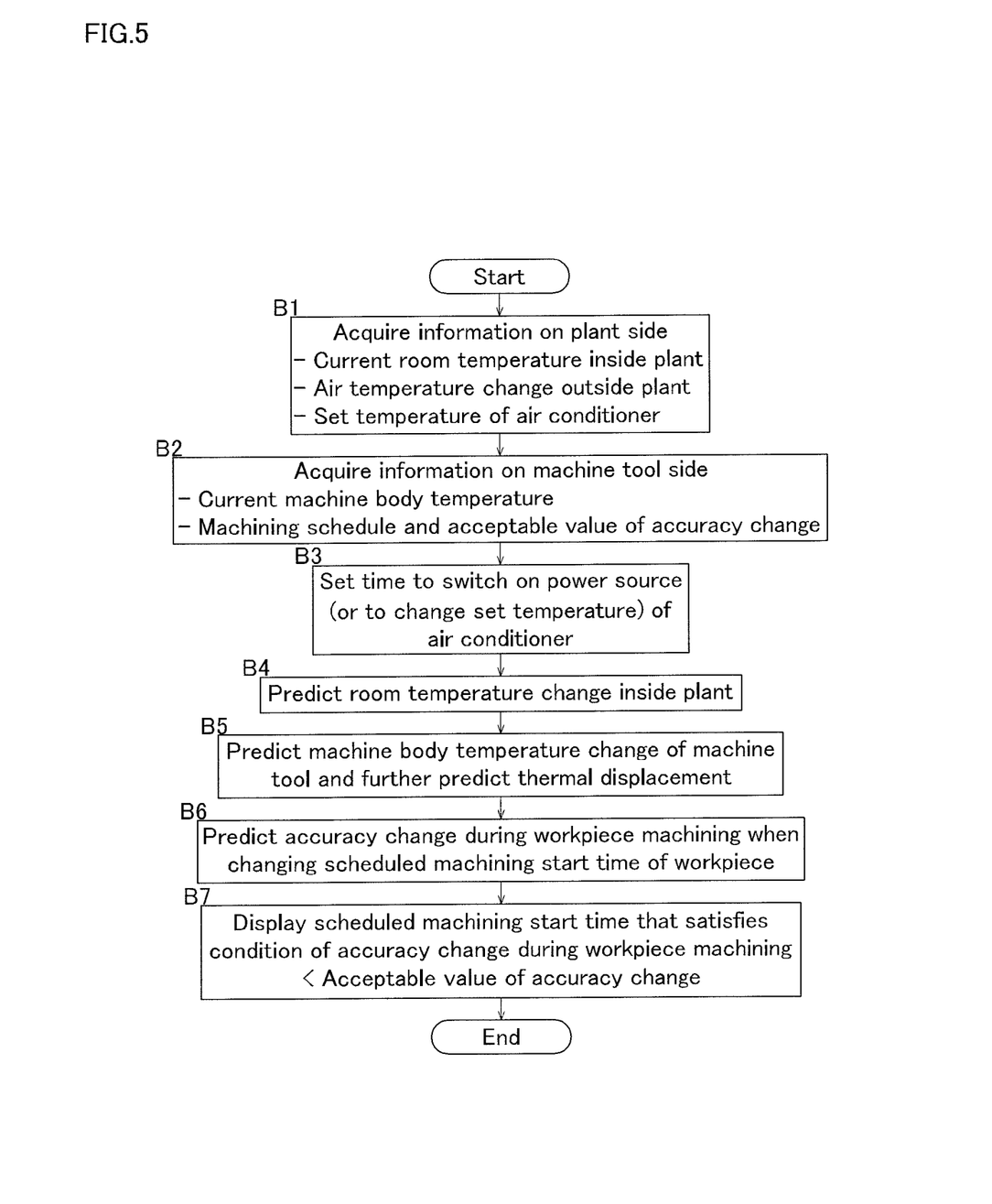
FIG. 5 is a flowchart of a machining accuracy diagnosing method according to Embodiment 2 of deciding a machining schedule when a schedule of an air conditioner is predetermined.

Phase B1: Acquiring the current room temperature inside the plant 1, the air temperature outside the plant 1, and power on/off and the set temperature of the air conditioner 3 as the information on the plant 1 side, namely temperature regulation operating pattern acquiring step and temperature information acquiring step. The process is the same as that described in Phase A1 of FIG. 2.

Phase B2: Acquiring information on the current machine body temperature, the machining schedule, and the acceptable accuracy change as the information on the machine tool 2 side, namely cutting condition acquiring step. For the machining schedule, a required cutting time is a fixed value because it is decided according to the machining. However, the scheduled machining start time is undecided at this point and will be decided after the process of subsequent Phase B6 is performed.

Phase B3: Setting a time to switch on the power source or change the set temperature of the air conditioner 3.

Phase B4: Predicting the room temperature change inside the plant 1 in association with the on/off of the air conditioner 3 and the setting change. The method of the calculation is the same as that of Phase A4.

Phase B5: Predicting the machine body temperature change and the thermal displacement of the machine tool 2 after the power source of the air conditioner 3 is switched on. The method of the calculation is the same as that of Phase A6.

Phase B6: Predicting the accuracy change during the workpiece machining when the scheduled machining start time of the workpiece is changed.

The period required for the machining of the workpiece is constant. Therefore, when the machining start time of workpiece $T_{w,start}$ is shifted to a later time, the machining end time of workpiece $T_{w,end}$ also shifts to a later time. In Formula 4, the accuracy change during workpiece machining $\Delta X_w$ is obtained while changing $T_{w,start}$ and $T_{w,end}$. Phase B3 to Phase B6 become the machining accuracy influence amount predicting step of the disclosure.

Phase B7: Displaying the scheduled machining start time that satisfies the condition in which the accuracy change during the workpiece machining is less than the acceptable value of the accuracy change as a result of the process of Phase B6, namely schedule changing step.

In the conditions illustrated in FIG. 3 and FIG. 4, it can be seen that it takes 10 hours after the power source of the air conditioner 3 is switched on until the temperature change of the machine tool 2 is stabilized and the finish machining can be performed. When this period is displayed on an operation screen or the like of the machine tool 2 as a machining accuracy stabilizing period, an operator can decide the machining schedule so as to perform the finish machining after the temperature change of the machine tool 2 is stabilized.

Thus, with the machining accuracy diagnosing device 10 and the machining accuracy diagnosing method of the above Embodiment 2, use of the information, such as the operating pattern of the air conditioner 3, the scheduled machining start time and the scheduled machining end time, and the room temperature inside the plant 1, ensures quantitatively predicting the influence of the air conditioner 3 on the machining accuracy.

In particular, the schedule changing unit 15 that changes the scheduled machining start time set by the cutting condition setting unit 12 based on the predicted influence amount on the machining accuracy is further provided. Therefore, according to the predicted influence on the machining accuracy, the machining schedule can be appropriately and easily changed to maintain the machining accuracy.

In addition, the schedule changing unit 15 changes the scheduled machining start time such that the influence amount on the machining accuracy predicted by the machining accuracy influence amount predicting unit 14 becomes smaller than the preset acceptable value of the accuracy change during the cutting time acquired from the cutting condition setting unit 12. Therefore, the machining schedule can be created considering the influence on the machining accuracy by predicting the period until the influence amount of the air conditioner 3 on the machining accuracy becomes equal to or less than the acceptable value. This is effective when the operating pattern of the air conditioner 3 is predetermined.

The following describes a modification example in common between Embodiment 1 and Embodiment 2.

While the time constants $T_{on}$, $T_{off}$, $T_{m,i}$ are used respectively in the above Formula 1, Formula 2, and Formula 4 for predicting the temperature change, these values need to be identified in advance for performing the prediction. A method of obtaining by a calculation from an area of a plant 1, volume of machine structures, physical property values of materials, and the like, and a method of identifying the values based on an actual measurement result can be considered. It is only necessary to decide the values of the time constants $T_{on}$, $T_{off}$, $T_{m,i}$ using a known parameter search method such that errors between the actual measurement result and the prediction result become small. Thus, by comparing the estimation result with the actual measurement result to modify the estimation formula, the accuracy of the prediction can be enhanced.

Furthermore, in making use of the machining accuracy diagnosing device 10, when a parameter can be identified and updated using the information on temperatures actually measured with the room temperature sensor 5 inside the plant 1 and the machine body temperature sensor 4 of the machine tool 2, the accuracy of the prediction can be further improved.

In the above Embodiments 1, 2, using the formulae based on the physical model as indicated in Formula 1 to Formula 5, the room temperature change, the temperature change of the machine tool 2, and the thermal displacement of the machine tool 2 are calculated in this order to calculate the influence amount on the machining accuracy. However, when the influence amount on the machining accuracy is obtained, the calculation based on a theoretical formula need not be necessarily performed. For example, using a method of machine learning, a model that calculates the influence amount on the machining accuracy can be created using the cutting time, temperature information, and the like as inputs.

Furthermore, in the above Embodiments 1, 2, while the schedule changing unit changes one of the operating pattern of the air conditioner and the scheduled machining start time based on the influence amount on the machining accuracy, the schedule changing unit can change both of them.

The numbers and the arrangements of a machine tool, an air conditioner, and respective temperature sensors are not limited to those in the above Embodiments 1, 2.

As the temperature regulating unit, in addition to the air conditioner exemplified in the above Embodiments 1, 2, a temperature regulating device that is directly installed on a machine body of a machine tool to perform temperature regulation, such as an oil jacket, which is a cooling passage, disposed on a column, is included. In this case, the acquired influencing temperature is a temperature of a coolant, and the time constant of the machine body temperature change is a value when the oil jacket is used. The "temperature regulation" includes not only cooling, but also warming.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A machining accuracy diagnosing device for a machine tool, the machining accuracy diagnosing device predicting and diagnosing an influence on a machining accuracy in a plant where the machine tool is installed when a machine body temperature of the machine tool is changed by a temperature regulating unit that affects the machine body temperature, the machining accuracy diagnosing device comprising:

a temperature regulation operating pattern setting unit that sets an operating pattern of the temperature regulating unit;

a cutting condition setting unit that sets at least a scheduled machining start time and a scheduled machining end time by the machine tool;

a temperature information acquiring unit that acquires an influencing temperature of the temperature regulating unit on the machine body temperature and/or an air temperature outside the plant; and a machining accuracy influence amount predicting unit that predicts an influence amount of the temperature regulating unit on the machining accuracy based on the following three inputs (i) the operating pattern of the temperature regulating unit acquired from the temperature regulation operating pattern setting unit, (ii) the scheduled machining start time and the scheduled machining end time acquired from the cutting condition setting unit, and (iii) at least one of the influencing temperature and/or the air temperature outside the plant acquired from the temperature information acquiring unit and a set temperature of the temperature regulating unit acquired from the temperature regulation operating pattern setting unit.

2. The machining accuracy diagnosing device for a machine tool according to claim 1, further comprising a schedule changing unit that changes at least one of the operating pattern of the temperature regulating unit set by the temperature regulation operating pattern setting unit and the scheduled machining start time set by the cutting condition setting unit based on the predicted influence amount on the machining accuracy.

3. The machining accuracy diagnosing device for a machine tool according to claim 2, wherein the schedule changing unit changes the operating pattern of the temperature regulating unit based on a comparison between the influence amount on the machining accuracy predicted by the machining accuracy influence amount predicting unit and a preset acceptable value of the influence amount during a cutting time acquired from the cutting condition setting unit.

4. The machining accuracy diagnosing device for a machine tool according to claim 3, wherein the schedule changing unit:
predicts consumption energy of the temperature regulating unit using the influencing temperature, the set temperature of the temperature regulating unit, and the air temperature outside the plant; and changes the operating pattern of the temperature regulating unit such that a condition in which the influence amount on the machining accuracy is smaller than the acceptable value is satisfied and the consumption energy of the temperature regulating unit becomes minimum.

5. The machining accuracy diagnosing device for a machine tool according to claim 2, wherein the schedule changing unit changes the scheduled machining start time such that the influence amount on the machining accuracy predicted by the machining accuracy influence amount predicting unit becomes smaller than the preset acceptable value of the influence amount during the cutting time acquired from the cutting condition setting unit.

6. The machining accuracy diagnosing device for a machine tool according to claim 1, wherein the temperature information acquiring unit includes a room temperature sensor measuring a room temperature inside the plant that becomes the influencing temperature and an outside air temperature sensor measuring the air temperature outside the plant, and the machining accuracy influence amount predicting unit estimates a room temperature change inside the plant during the cutting time acquired from the cutting condition setting unit by a preset room temperature change estimation formula based on a current room temperature inside the plant measured with the room temperature sensor and the set temperature of the temperature regulating unit or the air temperature outside the plant, estimates a machine body temperature change of the machine tool by a preset machine body temperature change estimation formula based on the estimated room temperature change inside the plant, and estimates a thermal displacement of the machine tool by a preset thermal displacement estimation formula based on the predicted machine body temperature change of the machine tool to obtain a change amount of the thermal displacement during the cutting time as an influence amount on a machining accuracy.

7. The machining accuracy diagnosing device for a machine tool according to claim 6, wherein the temperature regulating unit is an air conditioner installed inside the plant, and when estimating the room temperature change by the room temperature change estimation formula, the machining accuracy influence amount predicting unit estimates the room temperature change inside the plant using a set temperature of the air conditioner as an input when a power source of the air conditioner is turned on and using the air temperature outside the plant as an input when the power source of the air conditioner is turned off.

8. The machining accuracy diagnosing device for a machine tool according to claim 6, wherein the machining accuracy influence amount predicting unit compares a temperature measured with the room temperature sensor with the room temperature change estimated by the room temperature change estimation formula to modify the room temperature change estimation formula.

9. The machining accuracy diagnosing device for a machine tool according to claim 6, further comprising a machine body temperature sensor that measures the machine body temperature of the machine tool, wherein the machining accuracy influence amount predicting unit compares a temperature measured with the machine body temperature sensor with the machine body temperature estimated by the machine body temperature change estimation formula to modify the machine body temperature change estimation formula.

10. A machining accuracy diagnosing method for a machine tool, the machining accuracy diagnosing method predicting and diagnosing an influence on a machining accuracy in a plant where the machine tool is installed when a machine body temperature of the machine tool is changed by a temperature regulating unit that affects the machine body temperature, the machining accuracy diagnosing method comprising:

acquiring an operating pattern of the temperature regulating unit;

acquiring at least a scheduled machining start time and a scheduled machining end time by the machine tool;

acquiring at least one of an influencing temperature of the temperature regulating unit on the machine body temperature and/or an air temperature outside the plant and a set temperature of the temperature regulating unit; and predicting an influence amount of the temperature regulating unit on the machining accuracy based on the following three inputs (i) the acquired operating pattern of the temperature regulating unit, (ii) the acquired scheduled machining start time and scheduled machining end time, and (iii) at least one of the acquired influencing temperature and/or the air temperature outside the plant, and the set temperature of the temperature regulating unit.

11. The machining accuracy diagnosing method for a machine tool according to claim 10, further comprising changing at least one of the operating pattern of the temperature regulating unit acquired by the acquiring of the operating pattern and the scheduled machining start time acquired by the acquiring of the scheduled machining start time and the scheduled machining end time based on the predicted influence amount on the machining accuracy.

\* \* \* \* \*